US012250515B2

(12) United States Patent
Gkanos et al.

(10) Patent No.: US 12,250,515 B2
(45) Date of Patent: Mar. 11, 2025

(54) IN-EAR AUDIO DEVICE WITH RESONATOR

(71) Applicant: GN Audio A/S, Ballerup (DK)

(72) Inventors: Konstantinos Gkanos, Ballerup (DK); Jacob Reimert, Ballerup (DK)

( * ) Notice: Subject to any disclaimer, the term of this patent is extended or adjusted under 35 U.S.C. 154(b) by 225 days.

(21) Appl. No.: 17/899,639

(22) Filed: Aug. 31, 2022

(65) Prior Publication Data

US 2023/0062277 A1 Mar. 2, 2023

(30) Foreign Application Priority Data

Aug. 31, 2021 (EP) .................................... 21194120

(51) Int. Cl.
*H04R 1/28* (2006.01)
*H04R 1/08* (2006.01)
*H04R 1/10* (2006.01)

(52) U.S. Cl.
CPC ............. *H04R 1/2826* (2013.01); *H04R 1/08* (2013.01); *H04R 1/1016* (2013.01); *H04R 1/1075* (2013.01); *H04R 2460/11* (2013.01)

(58) Field of Classification Search
CPC ...... H04R 1/2826; H04R 1/08; H04R 1/1016; H04R 1/1075; H04R 2460/11; H04R 1/1083; H04R 2410/05; H04R 2460/01; G10K 11/17875; G10K 11/17857; G10K 11/17873; G10K 2210/1081
USPC ....... 181/135, 133, 128, 129, 130, 131, 277, 181/219; 381/380
See application file for complete search history.

(56) References Cited

U.S. PATENT DOCUMENTS 7,740,104 B1 * 6/2010 Parkins .................. A61F 11/08 181/129
8,186,478 B1 * 5/2012 Grason .................. A61F 11/08 181/129
8,792,669 B2 * 7/2014 Harsch ................ H04R 1/1016 381/370
2006/0042867 A1 * 3/2006 Haussmann ......... G10K 11/172 181/135
2011/0311070 A1 * 12/2011 Epping ................ H04R 1/1016 381/74
2013/0034260 A1 * 2/2013 Greger ................ H04R 1/1066 381/380
2018/0098143 A1 * 4/2018 Silvestri .................. H04R 1/02
2018/0221207 A1 * 8/2018 Cobabe ................ H04R 1/1016
2020/0186907 A1 6/2020 Kim et al.
2020/0322712 A1 * 10/2020 Williams ......... G10K 11/17875

FOREIGN PATENT DOCUMENTS

EP 2269292 8/2015

* cited by examiner

*Primary Examiner* — Carolyn R Edwards
*Assistant Examiner* — Julie X Dang

(57) ABSTRACT

Disclosed herein are examples of an in-ear audio device comprising a speaker cavity containing a speaker, a resonator comprising a resonator cavity and a resonator vent, wherein the resonator cavity is in fluid communication with the speaker cavity via the resonator vent, and a microphone comprising a microphone inlet, wherein the speaker cavity is in fluid communication with the microphone inlet via the resonator.

11 Claims, 3 Drawing Sheets

IN-EAR AUDIO DEVICE WITH RESONATOR

The present disclosure relates generally to an audio device, in particular an in-ear audio device having a resonator.

BACKGROUND

Audio devices, in particular those located within an ear and/or an ear canal of a user, can be advantageous for a variety of situations. For example, they can deliver audio directly to a user's ear drum, thereby improving sound quality of the audio received. This can be useful in situations such as phone calls and/or listening to music.

However, due to the physical properties of the ear canal and/or the audio device, a user can experience acoustic resonance such as resonant frequencies and/or resonant sounds. For example, an ear canal can amplify audio in the high frequency ranges dues to such resonances, causing discomfort and/or poor audio quality. The exact amount of amplification and the frequency range depends on the volume and length of the ear canal as well on other factors.

These resonances can contradict the requirements for a good music experience, and thus they need to be controlled. Additionally, ear-worn audio devices and in particular in-ear audio devices have strict requirements for minimization.

SUMMARY

Accordingly, there is a need for in-ear audio devices which can improve audio quality of an in-ear audio device.

There is a need for in-ear audio devices which may mitigate, alleviate, or address the existing shortcomings, for example by attenuating resonant frequencies in an ear canal.

Disclosed herein is an in-ear audio device. The in-ear audio device comprises a speaker cavity. The speaker cavity can contain a speaker. The in-ear audio device comprises a resonator. The resonator comprises a resonator cavity and/or a resonator vent. The resonator cavity is optionally in fluid communication with the speaker cavity, e.g. via the resonator vent. The in-ear audio device comprises a microphone. The microphone comprises a microphone inlet optionally in fluid communication with the resonator. The speaker cavity is optionally in fluid communication with the microphone inlet, e.g. via the resonator.

It is an advantage of the present disclosure that the in-ear audio device can provide control over the ear canal resonance, which can allow for smoother frequency response and better audio performance. For example, ear canal resonance can be attenuated. This can allow for music quality provided by the in-ear audio device to be improved.

Moreover, it is an advantage of the present disclosure to achieve higher maximum loudness produced by the in-ear audio device. The ear canal resonance typically limits the maximum loudness, and thus by suppressing the amplification of the resonance, the in-ear audio device can drive the speaker with more power and achieve higher maximum loudness.

Additionally, it is an advantage of the present disclosure to provide for a minimized assembly size for the in-ear audio device, thereby improving the user experience as well as the production process. Further, a compact mic-resonator assembly is achieved, and the size of the audio device is minimized.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
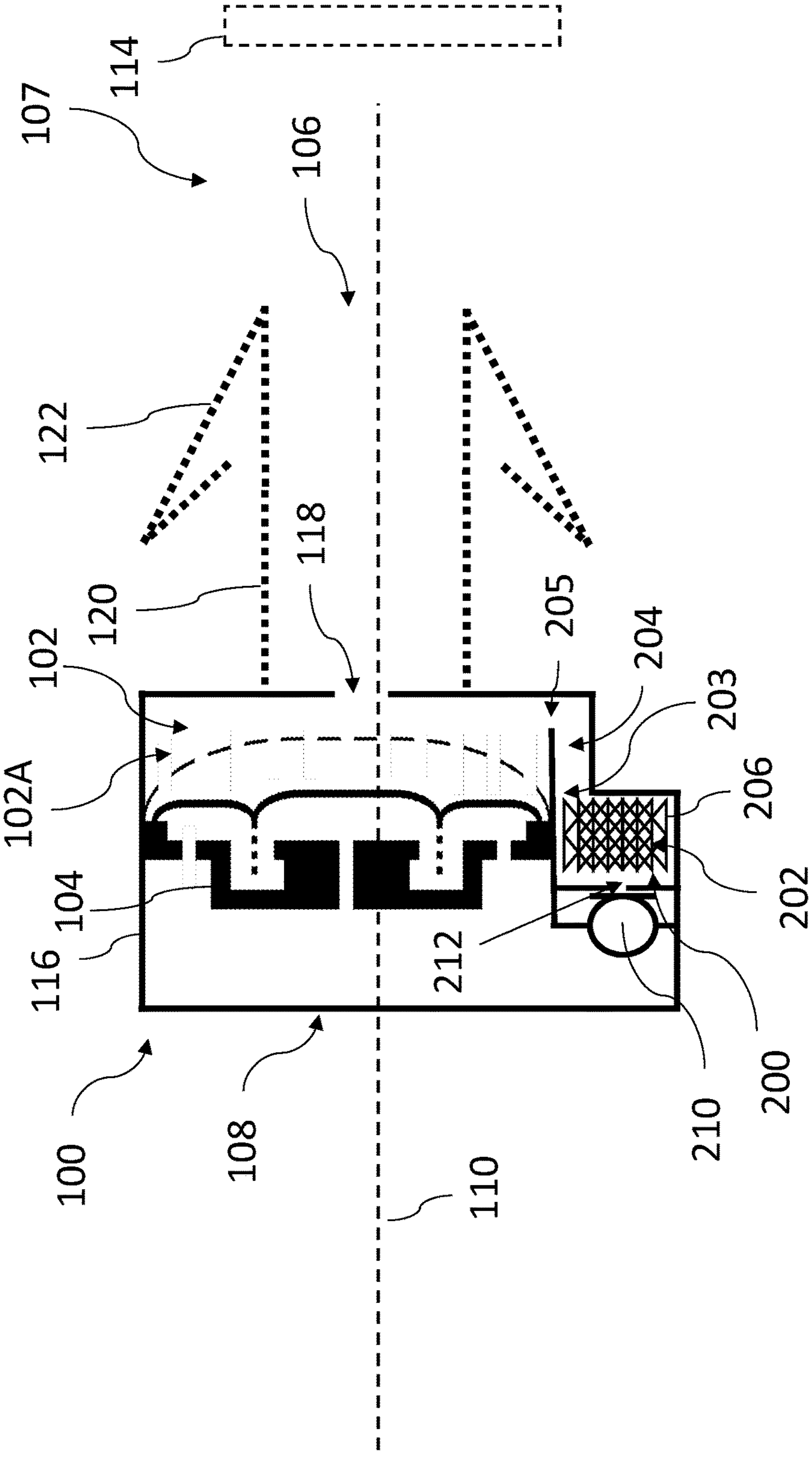
FIG. 1 illustrates an example in-ear audio device according to the disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown.

An aspect or an advantage described in conjunction with a particular embodiment is not necessarily limited to that embodiment and can be practiced in any other embodiments even if not so illustrated, or if not so explicitly described.

Disclosed herein are examples of audio devices, such as in-ear audio devices. The in-ear audio devices can be configured to be inserted partially or fully into an ear and/or an ear canal of a user. The in-ear audio devices can be configured to receive and/or provide audio, such as sounds, audio signals, and/or music and/or telephonic communication, into the ear canal of the user, such as towards an ear drum. The in-ear audio devices may be headphones, headsets, and/or hearing instruments. The in-ear audio devices may be the entire device. The in-ear audio devices may be a component or a portion of a device. When the audio device is placed in or at the ear, an ear canal cavity is formed between the eardrum and the in-ear audio device.

In one or more example in-ear audio devices, the in-ear audio device can be configured to occlude the ear canal when inserted into the ear canal. The in-ear audio device can be configured to partially and/or fully occlude the ear canal. This occlusion can promote high quality audio to be provided to the user, and can eliminate outside noise. However, the insertion and/or the occlusion can lead to undesired resonance within the ear canal or modify the resonance behaviour of the ear canal, especially in the high frequency ranges, thereby degrading audio quality. Advantageously, the example in-ear audio devices as described herein can reduce and/or avoid the audio degradation issues which may be caused by resonance.

An in-ear audio device is disclosed, the in-ear audio device comprising a speaker cavity containing a speaker; a resonator comprising a resonator cavity and a resonator vent, wherein the resonator cavity is in fluid communication with the speaker cavity via the resonator vent; and a microphone comprising a microphone inlet, wherein the speaker cavity optionally is in fluid communication with the microphone inlet via the resonator.

From an acoustic perspective, it might seem a suboptimal solution to place the microphone inlet such that it fluidly communicates with the speaker cavity via the resonator vent; however in many examples, the acoustic drawbacks are compensated and overturn by the advantages of having an audio device with a compact and minimized design in order to provide an improved fit into the user's ear or ear canal. Advantageously, the present disclosure allows that the extension of the in-ear audio device in directions perpendicular to the ear canal axis may be reduced, in particular for portions of the in-ear audio device that are intended to be arranged close to or in the ear canal.

In one or more example in-ear audio devices, the in-ear audio device can include a housing. The housing can be configured to at least partially contain, and/or enclose, the speaker. The housing can be configured to at least partially contain, and/or enclose, the resonator. The housing can be configured to at least partially contain, and/or enclose, the microphone. The housing may be made of any number of materials, and the type of material is not limiting. The housing may include electrical connections.

In particular, the in-ear audio devices disclosed herein may utilize a resonator, discussed in detail below, configured to attenuate certain frequencies. The resonator can be tuned in order to attenuate the high frequency resonant frequencies that may occur in the ear canal, e.g. with the insertion of the in-ear audio device into the ear canal, and/or with a resulting occlusion of the ear canal.

Moreover, the in-ear audio devices disclosed herein can include an in-ear microphone. An in-ear microphone is configured to detect audio in the ear canal when the audio device is in use. However, the in-ear microphone is in fluid communication with the resonator and optionally with the speaker cavity inside the housing, and at least in one or more example in-ear audio devices, the in-ear microphone does not include a separate microphone path or microphone opening/port in the housing.

As discussed herein, certain components, cavities and/or spaces may be in fluid communication, e.g. within or inside a housing of the audio device. This fluid communication can allow waves, such as sound waves, to pass between different components, cavities and/or spaces that are typically air-filled such that the sound waves propagate as airborne acoustic waves. This fluid communication can allow air to pass between different components, cavities and/or spaces.

In one or more example in-ear audio devices, the in-ear audio device can include a speaker cavity. The speaker cavity may contain a speaker. The speaker cavity may contain a plurality of speakers. The speaker cavity may be configured to contain a speaker and/or a plurality of speakers. The speaker cavity may comprise a front speaker cavity in front of, such as proximal to the speaker(s). The speaker can be configured to provide audio to a user. The speaker can be directed towards a user's ear drum, partially or fully, when the in-ear audio device is inserted into a user's ear. The particular type of speaker is not limiting. The speaker cavity, such as the front speaker cavity, may be in fluid communication with the ear canal and/or the surroundings via a first port. The first port may e.g. comprise an opening in the housing and/or an elongate tube-like outlet nozzle, e.g. adapted for partial or complete insertion into the ear canal of the user.

In one or more example in-ear audio devices, the in-ear audio device can include a resonator. The resonator can include a resonator cavity. The resonator can include a resonator vent.

The resonator can be a Helmholtz resonator. The resonator can be configured to act as a Helmholtz resonator. The resonator can be configured to act as a notch filter, e.g. with a center frequency in the range from 6 kHz to 9 kHz, such as about 7.5 kHz. In other words, the resonator may be configured to dampen or attenuate ear canal resonance.

For example, the resonator can be configured to attenuate frequencies within a certain range while passing frequencies from other ranges un-attenuated. The particular frequency range to be attenuated can be tuned as discussed below. The resonator can be configured to act as a passive filter.

In one or more example in-ear audio devices, the in-ear audio device can include a damping material. For example, the resonator cavity can contain a damping material. The resonator vent can contain a damping material. The resonator cavity and/or the resonator vent can contain a damping material.

The damping material can be an acoustically resistive material. For example, the damping material can be a foam. The damping material can be a damping foam. The damping material can be a mesh. The damping material can include multiple materials. The damping material can be selected from one or more of: a foam, a rubber, a polymer, a damping foam, and a mesh.

The gain of the resonator can be controlled by partly or completely filling the resonator cavity and/or the resonator vent with damping material (e.g. foam), introducing acoustic losses in the system. The damping material can be configured to absorb waves, such as sound waves. The particular damping material is not limiting.

The resonator cavity can be in fluid communication with the speaker cavity, such as the front speaker cavity. The resonator cavity can be in fluid communication with the speaker cavity, such as the front speaker cavity, via the resonator vent, e.g. within or inside the housing. The resonator vent may be located between the speaker cavity and the resonator cavity. In other words, fluid, e.g. air, passing from the speaker cavity to resonator cavity may enter the resonator vent from the speaker cavity, pass the resonator vent, and enter the resonator cavity from the resonator vent. The resonator vent can be directly in fluid communication with the resonator cavity. The resonator vent can be directly in fluid communication with the speaker cavity. The resonator vent can be indirectly in fluid communication with the speaker cavity, for example via an intermediate component, such as an outlet nozzle. The resonator vent may be in fluid communication with the surroundings, e.g. via the speaker cavity, such as via the front speaker cavity and/or an outlet nozzle. The resonator cavity may be in fluid communication with the surroundings via the resonator vent and optionally further via the speaker cavity, such as via the front speaker cavity and/or an outlet nozzle.

In one or more example audio device, the audio device comprises one or more additional sound paths, such as a first and/or second sound path from the front speaker cavity to the surroundings, e.g. when the in-ear audio device is inserted in the ear of the user. In other words, the first sound path and/or sound path may function and/or be configured as venting channel(s), e.g. via respective pressure relief or vent passages, between the surroundings and the ear canal cavity through the inside of the housing when the in-ear audio device is inserted in the ear of the user. The first sound path may end in a first auxiliary port in a portion of the housing that is exposed to the surroundings when the in-ear audio device is inserted in the ear of the user. The second sound path may end in a second auxiliary port or the first auxiliary port in a portion of the housing that is exposed to the surroundings when the in-ear audio device is inserted in the ear of the user.

In one or more example in-ear audio devices, the in-ear audio device can include a microphone. The microphone can be an in-ear microphone. The microphone can include a microphone membrane. The microphone can include a microphone inlet. The microphone can be configured to pick up or detect audio. The microphone can be configured to convert audio to an electrical signal. The microphone can be configured for guidance of fit of the in-ear audio device. The microphone can be configured for use in feed-forward and/or feed-backward active noise cancellation. For example, the microphone input signal of the microphone can be used to determine one or more of: amount of acoustic leakage between the ear canal and the surroundings, volume of ear canal, and length of ear canal.

In one or more example in-ear audio devices, the microphone inlet may be in fluid communication with the resonator cavity. The microphone inlet may be in fluid communication with the speaker cavity, such as the front speaker cavity, via the resonator cavity and/or via the resonator vent, e.g. within or inside the housing. In one or more example in-ear audio devices, the microphone inlet may be in fluid communication with the resonator vent, e.g. via the resonator cavity. The microphone inlet may be in fluid communication with the surroundings via the resonator vent and/or the speaker cavity, such as via the front speaker cavity, and/or via an outlet nozzle. In other words, the resonator, such as the resonator cavity and/or the resonator vent, and optionally the front speaker cavity may form at least a part of a sound path from the microphone inlet to the surroundings of the audio device, such as to the ear canal cavity when the in-ear audio device is inserted in the ear of the user. The sound path may include a first port and/or an outlet nozzle.

In one or more example in-ear audio devices, the microphone inlet may be in fluid communication with the speaker cavity, such as the front speaker cavity, via the resonator cavity, the resonator vent, and/or the ear canal cavity, e.g. at least partly outside the housing. In other words, the resonator, such as the resonator cavity and/or the resonator vent, may fluidly connect the microphone inlet with the ear canal cavity, e.g. through a second port in the housing, and the speaker cavity, such as the front speaker cavity, may be in fluid communication with the ear canal cavity through the first port and/or via an outlet nozzle. In one or more example in-ear audio devices, the speaker cavity, such as the front speaker cavity, can be in fluid communication with the microphone inlet, e.g. within the housing. In one or more example in-ear audio devices, the speaker cavity can be in fluid communication with the microphone inlet via the resonator, e.g. within the housing. In one or more example in-ear audio devices, the speaker cavity can be in fluid communication with the microphone inlet via the resonator vent and/or via the resonator cavity, e.g. within the housing. In one or more example in-ear audio devices, the resonator vent can be in fluid communication with the microphone inlet via the resonator cavity.

The in-ear audio device can be configured to be inserted into a user's ear and/or ear canal, for example to provide audio to an ear drum of a user. The in-ear audio device can include a proximal end. The in-ear audio device can include a distal end. The in-ear audio device can have an ear canal axis. The ear canal axis can extend between the proximal end and the distal end. The proximal end can be configured to be closer to an ear drum than the distal end when the in-ear audio device is inserted into an ear, such as an ear canal, of the user. The microphone, such as the microphone inlet can be distal to the front speaker cavity or even distal to the speaker cavity. The microphone, such as the microphone inlet may be distal to a front speaker cavity, e.g. proximal to the speaker.

In one or more example in-ear audio devices, the in-ear audio device may prevent and/or attenuate fluid communication, such as the propagation of sound waves, outside of the housing between the proximal end and the distal end when inserted into an ear canal. In one or more example in-ear audio devices, the in-ear audio device may occlude the ear canal when inserted into the ear and/or the ear canal.

The microphone can be distal to the speaker. The microphone inlet can be distal to the speaker. The microphone inlet can be distal to the speaker cavity. The microphone may not have any other fluid communication with the proximal end of the in-ear audio device other than through the fluid communication via the resonator and optionally the speaker cavity.

The proximal end of the microphone can be distal to the proximal end of the speaker cavity, such as the front speaker cavity. The proximal end of the microphone can be distal to the proximal end of the speaker. The microphone inlet can be distal to the proximal end of the speaker cavity. The microphone inlet can be distal to the proximal end of the speaker. In other words, the speaker, speaker cavity, and/or front speaker cavity may be arranged between the microphone/microphone inlet and the proximal end of the in-ear audio device.

The microphone can be distal to the resonator. The microphone inlet can be distal to the resonator. The microphone inlet can be distal to the resonator cavity and/or the resonator vent.

The proximal end of the microphone can be distal to the proximal end of the resonator cavity. The proximal end of the microphone can be distal to the proximal end of the resonator. The microphone inlet can be distal to the proximal end of the resonator cavity. The microphone inlet can be distal to the proximal end of the resonator.

The microphone can be proximal to the resonator. The microphone inlet can be proximal to the resonator. The microphone inlet can be proximal to the resonator cavity and/or the resonator vent.

The microphone can be aligned with the resonator from the distal end to the proximal end. The microphone inlet can be aligned with the resonator from the distal end to the proximal end. For example, the microphone inlet may extend from the resonator cavity at a surface that is orthogonal to ear canal axis. The microphone inlet may be within the resonator cavity, but not at a distalmost end of the resonator cavity. In one or more example in-ear audio devices, the microphone inlet extends from the resonator vent.

The housing can form at least a portion of the speaker cavity. The housing can form at least a portion of the resonator. The housing can form at least a portion of the resonator cavity. The housing can form at least a portion of the resonator vent. The housing can be separate from the speaker cavity and/or the resonator.

The housing can be sized and shaped to fit within a user's ear, such as a user's ear canal. The housing can include and/or be associated with further components which can improve the use of the in-ear audio device. For example, the housing can include and/or be associated with an outlet nozzle. The outlet nozzle can extend proximally away from the speaker and/or the speaker cavity. The outlet nozzle can be configured to direct sound towards a user's ear drum, e.g. from the front speaker cavity. The outlet nozzle can comprise or be, for example, a cavity, a sound director, and a cover. The outlet nozzle may include an outlet on one or more sides of the outlet nozzle. The outlet may be configured to relieve occlusion. The outlet may be connected to, such as being in fluid communication with, an occlusion relief tube. The outlet nozzle may define an outlet nozzle cavity extending therethrough. The outlet nozzle cavity may be in fluid communication with the speaker cavity, such as the front speaker cavity.

The housing can include and/or be associated an ear tip/dome. The ear tip can be, for example, an ear gel. The ear tip can be configured to conform with a user's ear canal and/or a portion thereof. The ear tip may be made of a flexible and/or soft material for improved comfort. For example, the ear tip may be one or more of: a rubber, a plastic, a gel. The ear tip may include an outlet configured to be directed towards an ear drum of a user when inserted. The ear tip may be arranged on the outlet nozzle.

In one or more example in-ear audio devices, the ear tip may include an ear tip cavity in fluid communication with the outlet nozzle cavity. The outlet nozzle may extend at least partly in the ear tip cavity.

The housing can include a port. The speaker cavity, such as the front speaker cavity. can include a port in the housing. The port can allow for fluid communication between the speaker cavity and outside of the housing, such as the ear canal cavity. The outlet nozzle may fluidly connect the front speaker cavity to the port. In other words, the port may be or form a proximal opening of the outlet nozzle. Thus the outlet nozzle can allow for fluid communication between the speaker cavity and the port. The outlet nozzle may comprise a tubular part. The port can allow for fluid communication between the speaker cavity and the ear tip. For example, the port can allow for fluid communication between the speaker cavity and the ear tip cavity. The port can allow for fluid communication between the speaker cavity, the outlet nozzle, and the ear tip. For example, the port can allow for fluid communication between the speaker cavity, the outlet nozzle cavity, and the ear tip cavity. The outlet nozzle may have a longitudinal extension, e.g. a tube-like shape, e.g. parallel to the ear canal axis.

In one or more example in-ear audio devices, the resonator can be integrated in the microphone inlet path, such as an in-ear microphone feeding tunnel. The microphone can be located on a back side of the speaker and/or speaker cavity. One or more fluid communication channels/sound paths can link the microphone inlet to the frontal side of the speaker or front speaker cavity, for example the port. That way, a compact microphone-resonator assembly can be achieved, and the size of the in-ear audio device can be advantageously minimized.

Advantageously, examples of the in-ear audio device can be used to attenuate or alter, such as reduce, restrain, remove, eliminate, filter, sound, such as resonance, audio waves, and/or audio signals. In particular, the in-ear audio device can attenuate ear canal resonance occurring due to the size and shape of the ear canal cavity when the in-ear audio device is inserted in the ear/ear canal. For example, the in-ear audio device can attenuate ear canal resonance caused by ¼ length resonance caused by ear canal cavity characteristics.

The amplification of ear canal resonance can be attenuated by examples of the in-ear audio device having a resonator. The resonator of the example in-ear audio devices can act like a notch filter that counteracts the resonance. In one or more example in-ear audio devices, the resonator may be tuned to a particular frequency and/or a particular band of frequencies. Tuning the resonator to a particular frequency can allow the resonator to attenuate the particular frequency.

For example, the resonator may be tuned at the frequency that corresponds to the average ear canal length. As another example, the center frequency and/or the Q factor of resonator can be tuned. This can occur, for example by altering the dimensions of the resonator cavity and/or the resonator vent, and/or by altering the amount and/or the properties of the damping material. For example, the dimensions can be physically altered.

The tuning can be done automatically. The tuning can be done manually. The tuning may be set during the manufacturing process. The tuning may be determined during use of the in-ear audio device. The tuning may be performed through the use of the microphone.

The configuration of the resonator can attenuate sound at one or more frequencies, such as frequency bands. The resonator can be configured to attenuate sound at one or more frequencies. The resonator can be configured to attenuate sound at one or more frequencies within a frequency range above 5 kHz. The resonator can be configured to attenuate sound at one or more frequencies within a frequency range of 6 kHz to 9 kHz.

The resonator can be configured to attenuate sound at one or more frequencies within a frequency range of 7 kHz to 8 kHz. The resonator can be configured to attenuate sound at one or more frequencies within a frequency range of 7 kHz to 7.5 kHz.

In one or more example in-ear audio devices, the in-ear audio device can be configured to reduce sound amplitude. The in-ear audio device can be configured to reduce sound amplitude at the ear canal resonance frequency. The in-ear audio device can be configured to reduce sound amplitude at the ear canal resonance frequency by at least 3 dB. The in-ear audio device can be configured to reduce sound amplitude at the ear canal resonance frequency by at least 1, 2, 3, 4, 5, 6, 7, 8, 9, or 10 dB.

In one or more example in-ear audio devices, the in-ear audio device can include a processor for controlling aspects of the in-ear audio device. For example, the in-ear audio devices can include one or more of: circuitry, memory, and connectors. The processor can be configured for one or more of: active noise cancellation, occlusion cancellation, own-voice pickup, and determination of acoustic leakage, such as between the housing and/or ear tip and the ear canal.

The processor may be connected to the microphone. The processor may be connected to the speaker.

The processor may be configured to attenuate sound automatically. The processor may be configured to attenuate sound manually, such as via user input. The attenuation may be set during the manufacturing process. The attenuation may be adaptive during use of the in-ear audio device. The attenuation may be configured to be turned on and off.

The in-ear audio device may have internal power source(s). The in-ear audio device may be rechargeable.

FIG. 1 illustrates an example schematic of an in-ear audio device of the disclosure. In particular, FIG. 1 shows an in-ear audio device 100. The in-ear audio device 100 includes a speaker cavity 102 including a front speaker cavity 102A. The speaker cavity 102 can contain a speaker 104.

The in-ear audio device 100 further includes a resonator 200. The resonator 200 can include a resonator cavity 202 and a resonator vent 204. The resonator cavity 202 and resonator vent 204 may be in fluid communication via resonator cavity inlet 203. The resonator cavity 202 is in fluid communication with the speaker cavity 102 via the resonator vent 204. For example, via resonator vent inlet 205. The resonator 200 can be a Helmholtz resonator. The resonator 200 can be configured to acts as a notch filter. The resonator 200 can be configured to attenuate sound at one or more frequencies within a frequency range above 5 kHz, such as within a frequency range from 6 kHz to 9 kHz.

The resonator cavity 202 can contain a damping material 206. The resonator vent 204 can contain the damping material 206. The resonator cavity 202 and/or the resonator vent 204 can contain the damping material 206. The damping material 206 can be, for example, a foam, a damping foam, and/or a mesh. The damping material 206 can partly or completely fill the resonator cavity 202 and/or the resonator vent 204.

The in-ear audio device 100 can further include a microphone 210. The microphone 210 can include a microphone inlet 212. As shown, the speaker cavity 102/front speaker cavity 102A can be in fluid communication with the microphone inlet 212 via the resonator 200. The resonator vent 204 can be in fluid communication with the microphone inlet 212 via the resonator cavity 202.

Further shown in FIG. 1, the in-ear audio device 100 can have proximal end 106. The in-ear audio device 100 can have a distal end 108. The in-ear audio device 100 can have an ear canal axis 110 extending between the proximal end 106 and the distal end 108. As shown, the proximal end 106 can be configured to be closer to an ear drum 114 than the distal end 108 when the in-ear audio device 100 is inserted in an ear and/or an ear canal of a user. Further, the microphone 210 can be distal to the speaker cavity 102 and/or to the front speaker cavity 102A. When the in-ear audio device 100 is inserted in an ear canal of a user, an ear canal cavity 107 is formed between the eardrum, the ear canal wall and the audio device.

Further shown in FIG. 1, the in-ear audio device 100 can include a housing 116. The housing 116 can be configured to at least partially contain the speaker 104. The housing 116 can be configured to at least partially contain resonator 200. The housing 116 can be configured to at least partially contain the microphone 210. Further, the speaker cavity 102, the resonator cavity 202, the cavity vent inlet 203 and/or the resonator vent inlet 205 can be formed as part of, or be contained within, the housing 116. The speaker cavity 102 may include a port 118 in the housing 116.

Thus, as shown in FIG. 1, sound waves can enter the housing 116 through port 118, pass through the resonator vent inlet 205 from the front speaker cavity 102A into the resonator vent 204, pass through the resonator cavity inlet 203 and into the resonator cavity 202 optionally holding or accommodating the damping material 206, and through the microphone inlet 212 to the microphone 210. This can occur as all of these components may be in fluid communication. Further, as shown, the microphone 210 may not have any further fluid communication paths.

The in-ear audio device 100 may optionally include further components shown in FIG. 1. For example, the in-ear audio device 100 may include a outlet nozzle 120. The outlet nozzle 120 can extend proximally from the housing 116 and may be a separate part or an integral part of the housing 116. The outlet nozzle 120 can be used to direct soundwaves towards the ear drum 114 and/or to retain the in-ear audio device 100 in the ear of the user. The in-ear audio device 100 may include an ear tip 122, such as an ear gel. The ear tip 122 may be connected to, associate with, and/or at least partially surround the outlet nozzle 120. The ear tip 122 may be associated with the housing 116. The ear tip 122 can be made of a soft and/or flexible material for comfort when the in-ear audio device 100 is inserted into an ear canal. The ear tip 122 and/or outlet nozzle 120 may include a cavity or lumen for sound waves to pass through, such as from the speaker 104 to the ear drum 114.

Advantageously, the in-ear audio device 100 can be configured to reduce sound amplitude at the ear canal resonance frequency by at least 3 dB.

Figure 2:
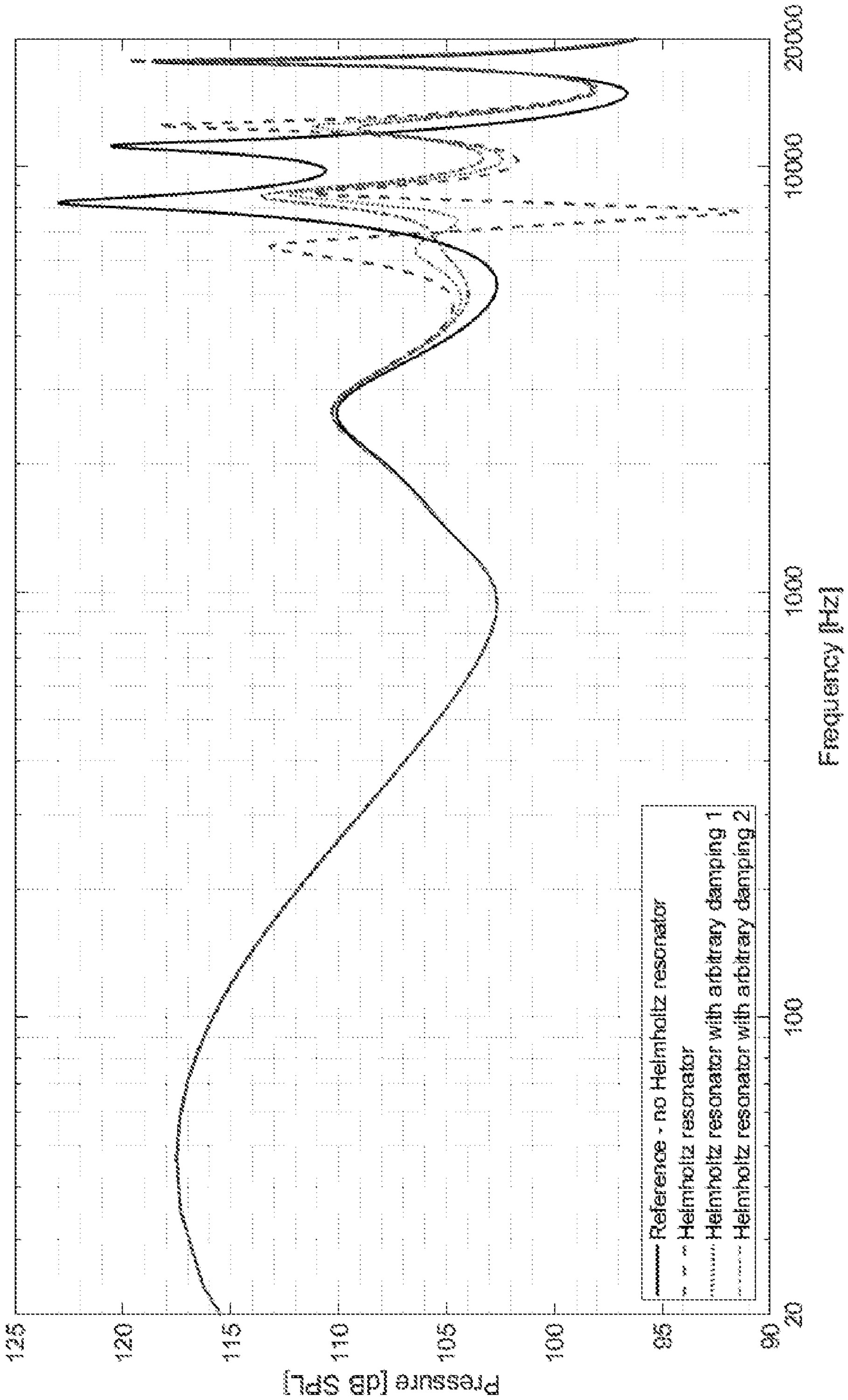
FIG. 2 illustrates an attenuation graph for an example in-ear audio device according to the disclosure.

FIG. 2 is a graph illustrating how an example in-ear audio device 100 of the disclosure can be used to attenuate resonant frequencies in an ear canal. As shown, without the use of a resonator 200, there may be high resonant spikes at around 7.5 kHz. This can lead to discomfort, or potential harm, to a user's ear and/or ear drum, as well as reduced audio quality. However, through the use of a tuned in-ear audio device 100 with a resonator 200, such as having a fundamental resonator frequency around 7.5 kHz, the resonant spike can be greatly counteracted, thus reducing the sound to the user. FIG. 2 further shows un-tuned resonators with arbitrary damping, thus tuned to have a wider attenuation frequency range around 7.5 kHz.

Figure 3:
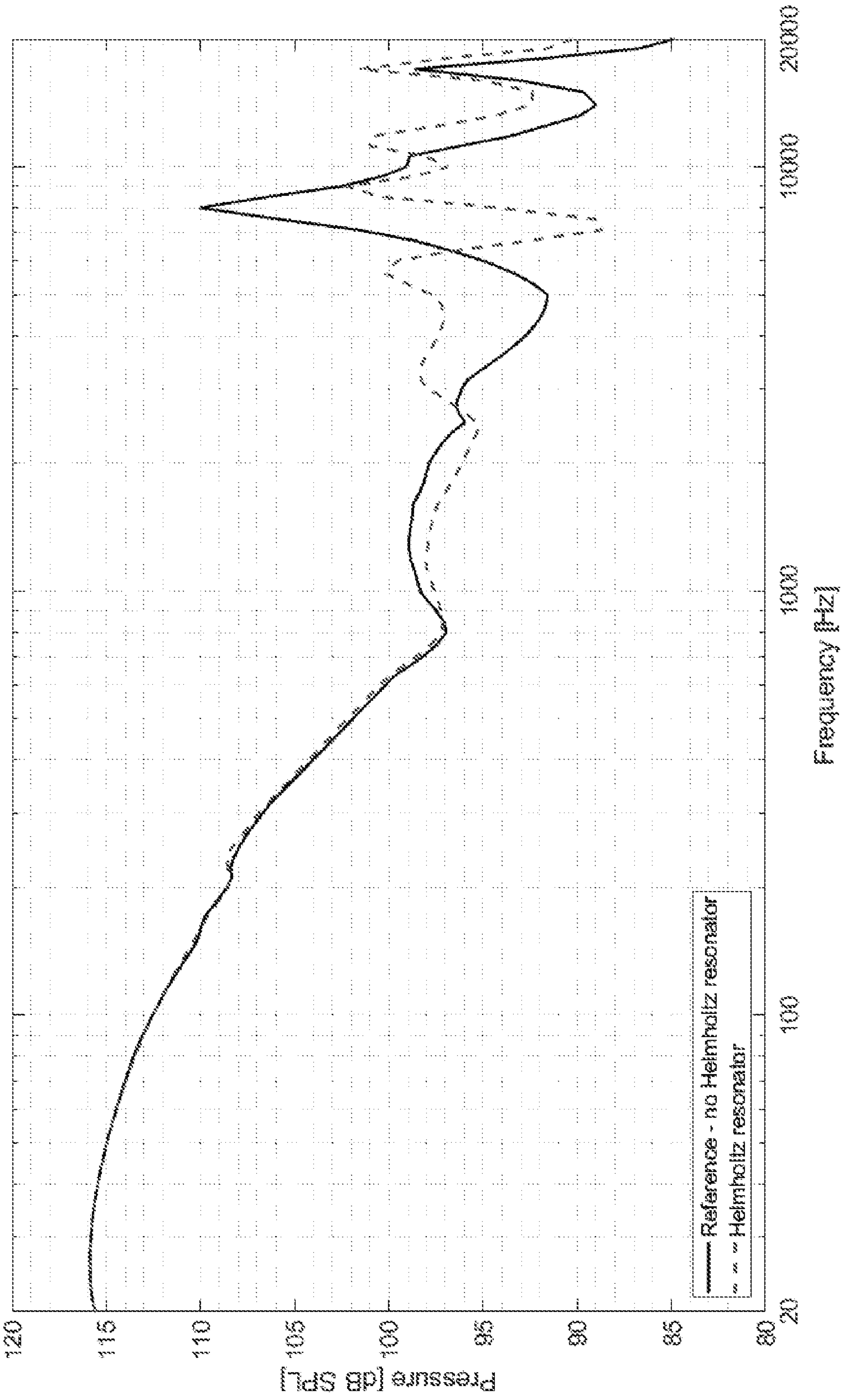
FIG. 3 illustrates an attenuation graph for an example in-ear audio device according to the disclosure.

FIG. 3 is another graph illustrating how an example in-ear audio device 100 of the disclosure can be used to attenuate resonant frequencies in an ear canal. Similar to FIG. 2, the resonator 200 can counteract the resonant spike, thereby improving audio quality for the user.

The Helmholtz resonator referenced in FIG. 2 and FIG. 3 may be the resonator 200 as discussed herein in the disclosure It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

Although features have been shown and described, it will be understood that they are not intended to limit the claimed invention, and it will be made obvious to those skilled in the art that various changes and modifications may be made without departing from the spirit and scope of the claimed invention. The specification and drawings are accordingly to be regarded in an illustrative rather than restrictive sense. The claimed invention is intended to cover all alternatives, modifications, and equivalents.

LIST OF REFERENCES

100 in-ear audio device
102 speaker cavity
102A front speaker cavity
104 speaker
106 proximal end
107 ear canal cavity
108 distal end
110 ear canal axis
114 ear drum
116 housing
118 port
120 outlet nozzle
122 ear tip
200 resonator
202 resonator cavity
203 resonator cavity inlet
204 resonator vent
205 resonator vent inlet
206 damping material
210 microphone
212 microphone inlet

The invention claimed is:

1. An in-ear audio device comprising:

a speaker cavity containing a speaker;

a resonator comprising a resonator cavity and a resonator vent, wherein the resonator cavity is in fluid communication with the speaker cavity via the resonator vent; and a microphone comprising a microphone inlet, wherein an ear canal is in fluid communication with the microphone, from a port to the speaker cavity, from the speaker cavity to the resonator cavity via the resonator vent to the microphone.

2. In-ear audio device of claim 1, wherein the resonator vent is in fluid communication with the microphone inlet via the resonator cavity.

3. In-ear audio device according to claim 1, wherein the resonator cavity and/or the resonator vent contains a damping material.

4. In-ear audio device of claim 3, wherein the damping material is a foam.

5. In-ear audio device according to claim 1, wherein the resonator is a Helmholtz resonator.

6. In-ear audio device according to claim 1, wherein the in-ear audio device comprises a proximal end, a distal end, and an ear canal axis extending between the proximal end and the distal end, the proximal end configured to be closer to an ear drum than the distal end when the in-ear audio device is inserted in an ear of a user, and wherein the microphone is distal to a front speaker cavity proximal to the speaker.

7. In-ear audio device according to claim 1, wherein the resonator is configured to attenuate sound at one or more frequencies within a frequency range above 5 kHz, such as within a frequency range from 6 kHz to 9 kHz.

8. In-ear audio device according to claim 1, further comprising a housing, wherein the housing is configured to at least partially contain the speaker, the resonator, and the microphone.

9. In-ear audio device of claim 8, wherein the speaker cavity comprises the port in the housing.

10. In-ear audio device according to claim 1, wherein the in-ear audio device is configured to reduce sound amplitude at the ear canal resonance frequency by at least 3 dB.

11. In-ear audio device according to claim 1, wherein the resonator is configured to act as a notch filter.

* * * * *